United States Patent

[11] 3,568,079

[72] Inventor Max N. Yoder
Washington, D.C.
[21] Appl. No. 819,059
[22] Filed Apr. 24, 1969
[45] Patented Mar. 2, 1971
[73] Assignee the United States of America, as represented by the Secretary of the Navy.

[54] ACOUSTIC SIGNAL AMPLIFIER
4 Claims, 3 Drawing Figs.

[52] U.S. Cl. .......... 330/5.5, 333/30
[51] Int. Cl. .......... H03f 3/04
[50] Field of Search .......... 330/5.5

[56] References Cited

UNITED STATES PATENTS

| | | | |
|---|---|---|---|
| 3,234,482 | 2/1966 | Rowen et al. | 330/5.5 |
| 3,334,307 | 8/1967 | Blum | 330/5.5 |
| 3,388,334 | 6/1968 | Adler | 330/5.5 |

*Primary Examiner*—Roy Lake
*Assistant Examiner*—Darwin R. Hostetter
*Attorneys*—R. I. Tompkins and L. I. Shrago

ABSTRACT: There is disclosed a microwave ultrasonic amplifier employing a piezoelectric semiconductor element fabricated with alternate amplifying and insulating sections. The insulating sections are included to periodically attenuate undesired, higher frequency, out of band phonon signals which would otherwise build up and saturate the amplifier. The coherent signals, because of their lower frequency, are not appreciably attenuated in these sections and, consequently, their amplitude is progressively increased in each amplifying section.

INVENTOR.
MAX N. YODER

ACOUSTIC SIGNAL AMPLIFIER

The invention described herein may be manufactured and used by or for the Government of the United States of America for governmental purposes without the payment of any royalties therein or therefor.

The present invention relates generally to ultrasonic apparatus such as acoustic amplifiers and delay lines and, more particularly, to microwave solid-state traveling wave devices.

In the microwave ultrasonic amplifier, a microwave acoustic signal is propagated through a piezoelectric semiconductor element. The acoustically induced compressions and rarefactions of the crystal lattice structure cause alternate positive and negative electric charges to be created by the nature of the piezoelectric coupling constant. If the piezoelectric crystal is doped with proper impurity ions, as is known in the semiconductor art, an electron drift may be initiated down the crystal with the application of an appropriate potential voltage. If the electrons are made to drift colinearly with the acoustic phonons and at a speed just in excess of the velocity of sound in the material, then these phonons will be amplified in a manner analogous to the amplification process occuring in the traveling wave tube.

Descriptions of the general type of microwave ultrasonic amplifier may be found in an article by A. R. Hudson, J. H. MacPhee, and D. L. White, appearing in the Physical Review Letters, Volume 7,No. 6,pages 237to 239,of Sept. 15, 1961.

One of the problems associated with the operation of these solid-state traveling wave amplifiers is due to the residual thermal phonons which exist in the piezoelectric semiconductor material. At room temperature, their frequency is somewhat near four orders of magnitude higher than the microwave signals which are of concern. Consequently, there are nearly $10^4$more gain-producing interactions per unit of piezoelectric semiconductor length for these undesirable thermal phonons than for the desired coherent phonons associated with the information signal. This rapid buildup of thermal phonons is one cause of the saturation of the amplifier and the reduction in gain of the coherent phonons.

In another type of ultrasonic amplifier arrangement, the piezoelectric crystal has a semiconductor element superimposed thereon. This allows one to independently choose the substrate crystal for optimum piezoelectric properties and the current-carrying medium for optimum semiconducting properties. However, the presence of the semiconductor layer on the surface of the crystal seriously impairs the propogation of the Raleigh wave. This occurs primarily because of the difference in the characteristic acoustic impedances of the two media. Also, the carriers drift through the entire cross section of the semiconductor slab but only those near the bottom interact with the phonon energy. Thus, a very larger percentage of the drifting carriers do not interact but create heat and contribute to the low efficiency of the device. Additionally, the phonon energy reaching the drifting carriers via the mechanism of the piezoelectrically generated electric field vectors is but a fraction of the available phonon energy. If an air gap is introduced to separate the crystals and improve the propogation of the acoustic wave a serious energy loss results in the crossing of this air gap.

It is accordingly a primary object of the present invention to provide a solid-state acoustic amplifier which discriminates against residual thermal phonon signals normally present in the amplifying medium.

It is another object of the present invention to provide a microwave ultrasonic amplifier in the form of a piezoelectric semiconductor element having nonamplifying sections which limit the noise buildup in the system.

Another object of the present invention is to provide a microwave ultrasonic amplifier for Raleigh waves wherein the amplification occurs in discrete regions of a semiconducting, piezoelectric crystal containing current carriers.

Other objects, advantages and novel features of the invention will become apparent from the following detailed description of the invention when considered in conjunction with the accompanying drawings wherein.

Briefly and in general terms, the objects of the invention enumerated above are accomplished by selectively modifying predetermined, spaced portions of a piezoelectric insulator so as to create current carriers in these regions. Each of these regions serves as a separate amplifying section when an appropriate DC potential is applied thereacross. As is well known, amplification of an acoustic wave occurs in such a piezoelectric semiconductor when the drift velocity of the carriers exceed the velocity of sound. However, as mentioned hereinbefore, the amount of amplification that may be realized with such a piezoelectric element is limited because of the saturation of the amplifier by residual thermal phonons existing in the material at room temperatures. In the present invention, these thermal phonons do not experience progressive amplification within the semiconductor since this element is not in the form of a continuous amplifying device but is composed of discreet amplifier sections followed by larger nonamplifying sections. Thus, while the coherent phonons associated with the microwave signal and the thermal phonons both experience amplification in each amplifying section, only the thermal phonons, because of their higher ($10^4$) frequency, suffer substantial attenuation in each nonamplifying section. Each amount of amplification experienced by the thermal phonon signals is therefore counteracted by an appropriate amount of attenuation and, hence, these signals build up only to a level related to the maximum amplitude available in any one amplifying section.

Figure 1:
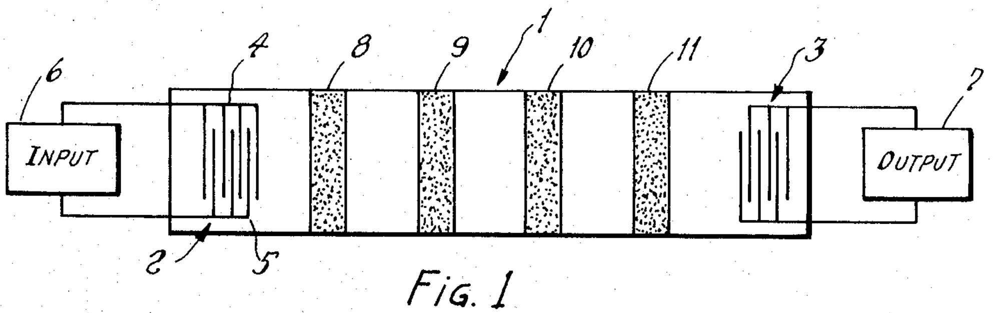
FIG. 1 shows a microwave ultrasonic amplifier employing Raleigh surface waves.

Referring now to FIG. 1 of the drawings which illustrates an arrangement for amplifying Raleigh or surface acoustic waves, it will be seen that the apparatus consists of a piezoelectric semiconducting element 1 having a pair of transducers 2 and 3 applied to a planar surface thereof at aligned, spaced locations which may be at opposite ends of the element. These transducers may be of the type described in U.S. Pat. No. 3,406,350of Oct. 15, 1968. More specifically, each transducer comprises a pair of interleaved or comblike ohmic contact elements, such as, for example, 4 and 5. The confronting vertical segments of each contact element are separated by a distance related to the acoustic wave length of the waves which are launched along the surface of the piezoelectric element.

In the operation of the amplifier, a suitable source of input signals 6 is coupled to transducer 2 and an output circuit 7 is coupled to transducer 3.

The piezoelectric semiconductor element may, for example, be made of cadmium sulfide or other suitable II—VI compounds. Some of the III—V compounds are also appropriate. Typical of the satisfactory II—VI compounds are CdS, ZnO and lithium metaniobate.

Figure 2:
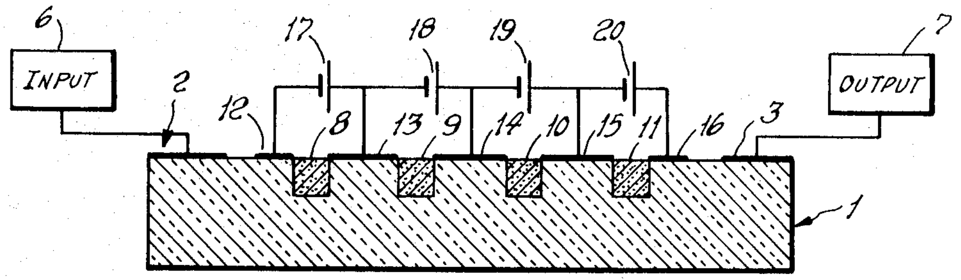
FIG. 2 is a cross section through the apparatus of FIG. 1 illustrating the various amplifying sections.

As discussed hereinbefore, the piezoelectric semiconductor is treated so as to have a multiplicity of spaced regions, such as 8, 9, 10 and 11, containing mobile charge carriers. As seen in FIG. 2, which is a cross section through element 1, each of the treated regions, greatly exaggerated in this figure, is bounded by the planar surface along which the surface waves propagate and extends downwardly therefrom a finite incremental distance. To accomplish this, that is, to obtain well defined areas with mobile charge carriers, an ion implantation process may be utilized.

In the case where the piezoelectric member is a II—VI compound, the III elements may be introduced to provide donor impurities, these elements serving as replacements for the II elements. Likewise, elements from the VII compounds may be utilized as donor replacements for the VI elements. In the first case just mentioned, B, A1, Ga, In, and T1 may be used, while in the second F, C1, Br and I may be employed. Where the piezoelectric element or the substrate material is lithium metaniobate, the II elements may serve as donors In the operation of the amplifier, each of the distinct regions 8, 9, 10, 11 has a DC voltage applied thereacross so as to bring about the movement of the charge carriers present in these sections. This movement is in the direction of the acoustic wave propogation and at an appropriate velocity so as to bring about amplification of this wave. Ohmic contacts, such as those depicted in FIG. 2 at 12, 13, 14, 15 and 16, may be applied to the planar surface of the piezoelectric element for this purpose. These contacts and the transducers may be formed in the same process. In the modification illustrated in FIG. 2, separate potential sources 17, 18, 19, 20 are utilized with the different amplifying sections. However, it should be appreciated that all of these sections may be operated in parallel from a single low voltage source. Because the amplifying apparatus of the present invention actually consists of a multiplicity of discrete amplifying sections, the voltage necessary to operate the apparatus is considerable less than the required in prior art solid-state amplifiers where the amplifying region is much more extensive and may extend over the complete region between the input and output transducers. Thus, the present apparatus has the advantage of being compatible with low voltage sources.

The purpose of having the insulating sections between the various amplifying sections, as mentioned hereinbefore, is to insure that the out of band noise signals present in the amplifying medium are sufficiently attenuated to nullify any amplification they receive in the amplifying sections. The frequency of these unwanted signals may be as much as four orders of magnitude as high as that of the information signals. Since the attenuation of phonons in crystal structures is approximately proportional to the third power of their frequency, in each unit length of the insulating section the thermal phonons will be attenuated as much as 12times the lower frequency coherent phonons of the information signal.

The apparatus above described, consequently, discriminates against thermal phonons in that these signals are significantly attenuated when they encounter an insulating region. Because of this attenuation, they never build up to a level where they saturate the amplifier. In the operation of the amplifier, they do experience a degree of amplification in each of the sections, such as 8 and 9. However, after leaving these sections, they become quickly attenuated to their normal level which is determined by the absolute temperature of the piezoelectric element. Since the process of amplification and attenuation is repeated down the piezoelectric element, when the undesired higher frequency phonons finally arrive at the region of the output transducer 3 they have only their original amplitude.

The coherent low frequency phonons, of course, do not experience the same treatment. These signals receive a given amount of amplification in each of the above sections but, since this incremental amplification is not nullified by an equivalent amount of attenuation in the following insulating section, these signals have a net increase in amplitude and this increase is cumulative down the amplifier.

The present invention eliminates undesired higher frequency phonon buildup. It increases the dynamic range of the amplifier and its maximum power capability. It would be pointed out that the charge carriers may be created in the piezoelectric semiconductor by a diffusion process as well as by the ion implantation technique mentioned hereinbefore. However, the diffusion method may somewhat impair the efficiency of the amplifier since it may not yield amplifying sections with the precise dimension desired.

The ion implantation technique employed in the present invention does not place any foreign crystalline structure or any other impediment near the surface of the piezoelectric element along which the phonon wave is propagating and, consequently, the treated area of the crystal neither attenuates the desired signal nor changes its mode of propogation.

The ion implantation procedure also places selected ion dopants in substitutional sites of the piezoelectric insulator so as to form a thin, substrate layer region of semiconducting material through which the carriers may be made to drift in neat proximity to and parallel to the phonon energy without modifying the propogation mode of the surface acoustic wave or the crystal lattice structure through which this surface wave travels. Another advantage of creating the amplifying regions by ion implantation is that this technique requires a drift region of electrons in such close proximity to the surface that all of the drifting electrons interact with the electric field vectors generated by the phonon beam through the action of the piezoelectric coupling constants. This results in a much more efficient amplifier than those previously conducted where only a small fraction of these electrons interact with the phonon energy. Moreover, since there are substantially no electrons or carriers which produce heat only, the amplifier can operate at a much higher duty cycle. Also, since the electrons are restricted to a thin region below the crystalline surface, the electron mobility problems associated with thin semiconductor layers on the surface of crystals are not present.

Figure 3:
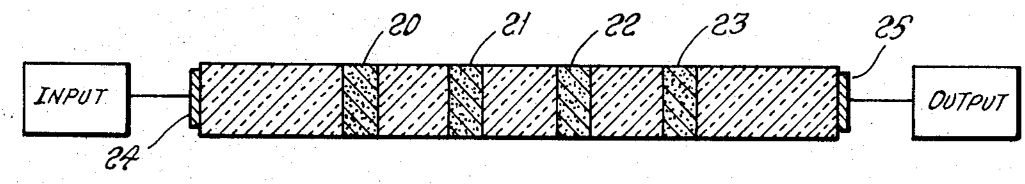
FIG. 3 is a simplified drawing showing how the amplifier may be used with bulk waves.

In the apparatus of FIG. 1, the acoustic signal is a surface wave launched along one of the boundary surfaces of the piezoelectric element. With this type of acoustic signal, it will be appreciated the amplifying regions need only occur along an equivalent top strip of the piezoelectric element and need not extend downwardly any appreciable distance. This fact simplifies the formation of these amplifying regions. However, the operating principle of the present invention may be used with all types of acoustic signals, that is, both bulk and surface waves, the latter including Raleigh, Love and Stokes waves. In the case of the bulk waves, the arrangement of FIG. 3 may be employed. Here, the amplifying regions, such as 20, 21, 22, 23, are complete layers extending through the crystal. These layers are energized in a manner similar to that shown in FIG. 2. Appropriate transducers, such as 24 and 25, cooperate with a pair of opposite faces of the transducer to launch and receive the acoustic waves.

It would also be pointed out that the ion implantation technique and its enumerated advantages can be realized not only in amplifiers having segmented amplifying sections, such as the device shown in FIG. 1, but also, it can be utilized in apparatus utilizing continuous layers or strips as well.

I claim:

1. An acoustic signal amplifier comprising, in combination:

a piezoelectric semiconductor element having a planar surface;

said piezoelectric semiconductor element being modified to have a multiplicity of spaced zones containing current carriers;

means for launching an acoustic signal along said planar surface of said piezoelectric semiconductor element in a direction such that said acoustic signal travels through said zones;

means for thereafter detecting said acoustic signal; and means for applying a potential across each zone so as to cause the current carriers therein to drift in a direction parallel to the direction of travel of said acoustic signal at a velocity sufficient to cause amplification of said acoustic signal in each zone.

2. In an arrangement as defined in claim 1 wherein said zones have as one boundary preselected areas of said planar surface.

3. An acoustic signal amplifier comprising, in combination;

a piezoelectric semiconductor element having a planar surface;

said element being modified so as to have a multiplicity of spaced zones containing mobile charge carriers;

said zones being bounded on one side with said planar surface and extending into said element a finite distance only sufficient to permit the coherent photons of a Raleigh surface wave propagating along said planar surface to interact with said mobile charge carriers;

a transducer mounted of said piezoelectric semiconductor element and adapted, when excited by an electrical signal, to launch a corresponding acoustic signal in the form of a Raleigh wave along said planar surface and through said zones;

means for detecting said acoustic signal after it has passed through said zones; and means for applying a DC potential across each zone so as to cause the mobile charge carriers therein to drift in a direction parallel to the direction of propogation of said acoustic signal at a velocity sufficient to cause amplification of said acoustic signal in each zone.

4. In an arrangement as defined in claim 3 wherein selected portions of said piezoelectric semiconductor elements are modified by ion bombardment to have the mobile charge carriers present therein.